UNITED STATES PATENT OFFICE.

JOSEPH E. JOHNSON, JR., OF HARTSDALE, NEW YORK; MARGARET HILLES JOHNSON EXECUTRIX OF SAID JOSEPH E. JOHNSON, JR., DECEASED.

PROCESS OF MAKING FERROSILICON AND BY-PRODUCTS.

1,318,763. Specification of Letters Patent. Patented Oct. 14, 1919.

No Drawing. Application filed June 16, 1917. Serial No. 175,233.

*To all whom it may concern:*

Be it known that I, JOSEPH ESREY JOHNSON, Jr., a citizen of the United States, residing at Hartsdale, in the county of Westchester and State of New York, have invented new and useful Improvements in Processes of Making Ferrosilicon and By-Products, of which the following is a specification.

My invention relates to the manufacture of ferro-silicon and consists in a new and improved process whereby this alloy is made from comparatively inexpensive minerals, with the simultaneous production of valuable by-products in a commercially pure condition.

As a source of silica for the necessary silicon I use feldspar or some other potassium containing silicate which is abundant and inexpensive. I charge this into a high temperature furnace with iron, or iron ore, and coke, or other reducing agent, and with lime, or other flux, when the last is necessary, and then apply heat to such a degree and for such length of time that the major portion of the silicon is reduced from the silica and unites with the iron, forming ferro-silicon. By this reduction of the silica and by the high temperature, the potassium, with or without other alkali metal compounds, is driven off as a fume with the gases and is recovered by any desirable means, for instance scrubbing or electrical precipitation. The potassium is recovered, either as potassium carbonate or potassium hydroxid, in a commercially pure form suitable for chemical purposes and not merely to be used as fertilizer. If there is some sodium compound in the mineral, this sodium compound comes off with the potassium compound but is easily crystallized out by usual means.

I do not propose to reduce all the silica but to leave sufficient to assist in fluxing the alumina, if there is any contained in the mineral. Furthermore it is an advantage not to reduce all the silica, because, by reducing a part only, more feldspar is utilized and more of the potassium compound is produced per ton of ferro-silicon.

The great obstacle to recovering the potassium from feldspar and other silicate minerals in which it is found lies in the difficulty of disposing of the silica which has a strong affinity for the potassium, therefore it is difficult to separate the two. But the energy required for separating the silica from the potassium is small compared to that required for reducing silica to silicon, therefore the fuel (or power) consumption of my process is not materially greater than the fuel (or power) consumption of an ordinary ferro-silicon furnace.

And in this lies the fundamental idea of my invention—I have devised a process having the important double result of producing both ferro-silicon and potassium compounds, and in this I raise the heat to such a high degree not only that the silicon is reduced to unite with the iron, but that the potassium compounds and other alkali metal compounds are driven off in fumes, easily recovered, and when recovered they are in the most valuable condition, that is, not combined with mineral acids.

The cost of producing ferro-silicon by my process is only slightly greater, if any, than by the ordinary processes; while the value of the potassium compound produced is many times greater than any possible increased cost.

My process may be practised by means of various high temperature furnaces, electric, blast furnaces or other kinds. After the silicon is reduced and the potassium compound has been vaporized, there is left a slag consisting largely of alumina. This may be run off by itself.

Attempts have been made to produce potassium compounds from feldspar but so far as I am aware they have not proven either successful or practical.

Having described my invention I claim,

1. A process having the double result of producing ferro-silicon and potassium compound, which consists in heating a mineral, containing silica and potassium with ferrous material and carbon to such a degree that the silica is reduced to unite with the iron, and the potassium compound is driven off as a fume, and then recovering the fume.

2. A process for simultaneously producing ferro-silicon and commercially pure potassium compounds, which consists in selecting a mineral containing silica and potassium, heating the mineral in the presence of a ferrous material and carbon in a high temperature furnace to such a degree that the silica is reduced to silicon to unite with the iron and the potassium compounds are driven off as a fume in the gases, and then recovering the potassium compounds.

3. A process for simultaneously producing ferro-silicon and a potassium compound, consisting in heating feldspar, carbon and iron containing material in a high temperature furnace to such a degree that the silica is reduced to silicon to unite with the iron, and the potassium compound is driven as a fume in the gases, and then recovering the potassium compound.

In testimony whereof I have signed my name to this specification.

JOSEPH E. JOHNSON, Jr.